March 4, 1958  L. J. PALUSH  2,825,186
ULTRASONIC DRILL
Filed Feb. 27, 1956
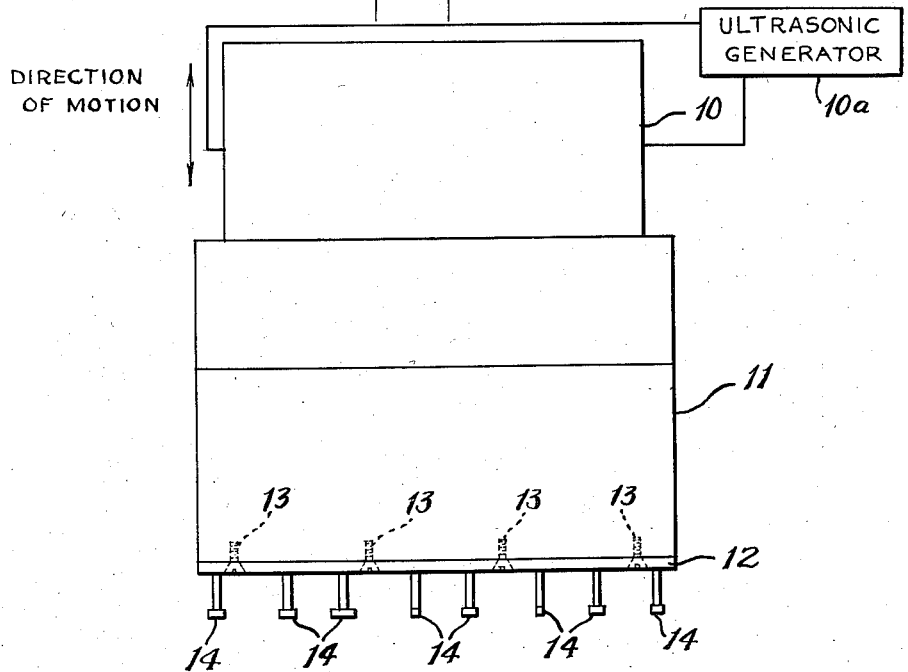
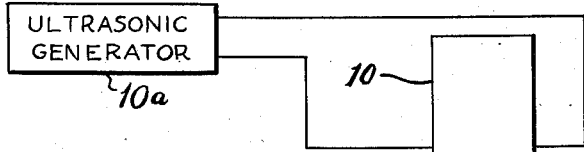
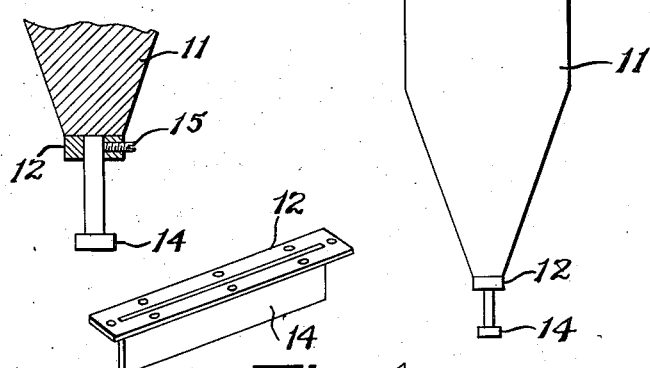
INVENTOR.
LOUIS J. PALUSH
BY
Cyrus D. Samuelson
ATTORNEY

United States Patent Office 2,825,186
Patented Mar. 4, 1958

2,825,186

ULTRASONIC DRILL

Louis J. Palush, Laurence Harbor, N. J., assignor to Gulton Industries, Inc., Metuchen, N. J., a corporation of New Jersey Application February 27, 1956, Serial No. 568,006

4 Claims. (Cl. 51—59)

My invention relates to ultrasonic drills and more particularly to those ultrasonic drills which may be employed to cut two or more holes simultaneously.

Ultrasonic drilling and cutting is employed when it is necessary to cut shaped holes and intaglios in various types of materials. This method is particularly useful in cutting holes and intaglios which have sharp corners and breaks such as squares, triangles and similar figures which do not lend themselves to production by conventional rotary drilling methods. Ultrasonic drilling techniques, which utilize tool motion normal to the work material, have been found to produce a cut in exact reverse to the shape of the cutting tool. Ultrasonic drilling is also employed when it is necessary to cut holes or intaglios in brittle material which cannot be drilled by the usual mechanical drilling methods.

Many applications require that several intaglio cuts of the same or of different shape be made to the same depth in the work material. Up to now, it has been necessary to provide extremely accurate measuring and resetting devices and to measure the depth of cut several times during the cutting process in order to do the work properly. There has been a growing and continuing need for devices which can cut several holes or intaglios to the same depth in a piece of work material economically, accurately and efficiently.

Accordingly, it is a principal object of my invention to provide an ultrasonic drill which is capable of simultaneously cutting two or more holes or intaglios in a piece of work material.

It is a further object of my invention to provide an ultrasonic drill which will cut two or more holes or intaglios to a predetermined depth in a piece of work material.

Other objects and advantages of my invention will be apparent during the course of the following description.

In the accompanying drawings, forming a part of this application, and in which like numerals are employed to designate like parts throughout the same, Figure 1 is a front elevational view of a preferred embodiment of my invention, Figure 2 is a side elevational view of the embodiment of Figure 1, Figure 3 is a cross-sectional view of a portion of the horn and the tool base, illustrating a preferred method of holding a tool member in the tool base, and Figure 4 is a perspective view showing a single tool, which may be used for slotting, affixed to the tool end.

In the drawings, wherein for the purpose of illustration, is shown a preferred embodiment of my invention, the numeral 10 designates the transducer which is driven by ultrasonic generator 10a and which is suitably attached to horn 11 (a mechanical transformer). Tool base 12 is secured to horn 11 by means of screws 13 and tools 14 are securely held in tool base 12 by means of set screws 15.

Other methods different from those illustrated may be employed in order to suitably attach 12 to 11 and 14 to 12. It is within the contemplation of my invention that 12 be made an integral part of 11 and that tools 14 be suitably attached directly to 11. Tools 14 may be soldered or otherwise fastened in recesses provided in 11 or 12 in lieu of the method shown in Figure 3. Tools 14 may have various cutting shapes and may be irregularly spaced each from each as dictated by the individual work requirement. The method utilizing my invention permits all holes or intaglios made or cut during a single operation to be of uniform depth. In addition, it is possible to cut holes or intaglios of different depths during a single operation by adjusting the lengths of individual tools 14 with respect to each other.

I prefer to form transducer 10 in the shape of a bar or slab and fabricate it of polarized barium titanate but any other transducer material may also be utilized. Transducer 10 may also be formed of a set or stack of electro-mechanically sensitive bodies which together act in the same manner as the single piezoelectric bar. These bodies may be of polarized barium titanate or any other suitable piezoelectric. Transducer 10 is excited in the mode which will cause it to vibrate in the vertical direction as indicated by the two-headed arrow of Figure 1 by ultrasonic generator 10a. Since 10 is fixedly attached to 11, the motion of 10 causes 11 to move in the same direction as 10, thereby moving tools 14 in the vertical direction. If all tools 14 are of exactly the same length, they will simultaneously cut to the same depth (even displacement) in the work material and a mechanical stop can be attached to the drill so that the several tools will not cut beyond the predetermined depth. This is useful and often necessary because all the tools 14 do not cut to exactly the same depth on each individual movement of the drill. Other transducers such as the magnetostrictives or natural piezoelectrics may also be utilized as transducer 10.

Drills of my invention may be utilized for cutting slots in material in a single operation. Under such conditions, one or more tools 14, of the shapes to be cut, as shown in Figure 4, are mounted to tool base 12, thereby making it possible to cut relatively long, narrow slots of the proper shape and dimensions.

The longitudinal dimensions of 10 and 11 may be varied in accordance with the number or the size of tools 14 for which the particular unit is designed.

Horn 11 is formed as shown in the figures. It is wider at the transducer end than at the tool member end, being tapered on one pair of vertical surfaces as shown in Figure 2; I prefer to call this tapered pair of surfaces the longitudinal surfaces. There is no taper in the other pair of surfaces; the two ends of the horn, which I choose to call the lateral surfaces, are substantially parallel. This results in a horn which differs from any of the prior art devices in that the presently known mechanical transformers are generally surfaces of revolution or combinations of surfaces of revolution. The prior art mechanical transformers possess radial symmetry whereas the mechanical transformers of my invention possess bilateral symmetry.

While I have described my invention by means of specific examples and in a specific embodiment, I do not wish to be limited thereto, for obvious modifications will occur to those skilled in the art without departing from the spirit of my invention or the scope of the subjoined claims.

Having thus described my invention, I claim:

1. An ultrasonic drill comprising an electro-mechanically sensitive body, a mechanical transformer affixed to said electro-mechanically sensitive body, the longitudinal dimension of said mechanical transformer being substantially greater than the lateral dimension, the lateral dimension of said mechanical transformer adjacent said electro-mechanically sensitive body being greater than that at the opposite end thereof, the lateral surfaces of said mechanical transformer being substantially parallel, and means for affixing at least one tool to the end of said mechanical transformer having the smaller lateral dimension.

2. An ultrasonic drill as described in claim 1 wherein said electro-mechanically sensitive body is a piezoelectric ceramic bar.

3. An ultrasonic drill comprising an electro-mechanically sensitive body, a mechanical transformer affixed to said body, the longitudinal dimension of said mechanical transformer being substantially greater than the lateral dimension, the lateral dimension of said mechanical transformer adjacent said electro-mechanically sensitive body being greater than that at the opposite end thereof, the lateral surfaces of said mechanical transformer being substantially parallel, a plurality of cutting tools affixed to the end of said mechanical transformer having the smaller lateral dimension and means for exciting said electro-mechanically sensitive body.

4. An ultrasonic drill as described in claim 3 wherein said electro-mechanically sensitive body is a piezoelectric ceramic bar.

References Cited in the file of this patent

UNITED STATES PATENTS

| 2,044,807 | Noyes | June 23, 1936 |
| 2,616,223 | Jonker | Nov. 4, 1952 |
| 2,632,858 | Calosi | Mar. 24, 1953 |
| 2,736,144 | Thatcher | Feb. 28, 1956 |

FOREIGN PATENTS

| 965,199 | France | Feb. 15, 1950 |